(12) United States Patent
Hutchinson et al.

(10) Patent No.: US 9,047,582 B2
(45) Date of Patent: Jun. 2, 2015

(54) METHODS AND SYSTEMS FOR MANAGING ENTERPRISE ASSETS

(75) Inventors: Robin Hutchinson, Chagrin Falls, OH (US); John Giubileo, Shawnee, KS (US); Darci O'Brien, Kansas City, MO (US)

(73) Assignee: CA, Inc., New York, NY (US)

(*) Notice: Subject to any disclaimer, the term of this patent is extended or adjusted under 35 U.S.C. 154(b) by 1939 days.

(21) Appl. No.: 10/264,879

(22) Filed: Oct. 4, 2002

(65) Prior Publication Data
US 2004/0010571 A1 Jan. 15, 2004

Related U.S. Application Data

(60) Provisional application No. 60/389,539, filed on Jun. 18, 2002.

(51) Int. Cl.
G06F 15/16 (2006.01)
G06F 15/173 (2006.01)
G06Q 10/10 (2012.01)
H04L 29/06 (2006.01)

(52) U.S. Cl.
CPC ............. G06Q 10/10 (2013.01); H04L 63/102 (2013.01); H04L 63/0428 (2013.01); H04L 63/20 (2013.01)

(58) Field of Classification Search
USPC ................ 709/200–202, 219, 224, 217, 218; 717/169–178; 713/201
See application file for complete search history.

(56) References Cited

U.S. PATENT DOCUMENTS

| 5,513,314 | A |   | 4/1996  | Kandasamy et al. ..... 395/182.04 |
|-----------|---|---|---------|-----------------------------------|
| 5,678,002 | A | * | 10/1997 | Fawcett et al. ................ 715/709 |
| 5,742,829 | A | * | 4/1998  | Davis et al. .................... 717/178 |
| 5,859,969 | A | * | 1/1999  | Oki et al. ....................... 709/200 |
| 6,052,720 | A |   | 4/2000  | Traversat et al. ............. 709/220 |
| 6,075,943 | A | * | 6/2000  | Feinman ........................ 717/175 |
| 6,112,305 | A | * | 8/2000  | Dancs et al. .................. 713/156 |
| 6,185,689 | B1 | * | 2/2001 | Todd et al. ....................... 726/25 |
| 6,199,204 | B1 | * | 3/2001 | Donohue ...................... 717/178 |
| 6,272,677 | B1 | * | 8/2001 | Lam et al. ..................... 717/170 |
| 6,298,445 | B1 | * | 10/2001 | Shostack et al. ................ 726/25 |
| 6,308,061 | B1 | * | 10/2001 | Criss et al. .................... 455/418 |
| 6,324,692 | B1 | * | 11/2001 | Fiske ............................ 717/171 |
| 6,327,617 | B1 | * | 12/2001 | Fawcett ........................ 709/219 |
| 6,347,398 | B1 | * | 2/2002 | Parthasarathy et al. ....... 717/178 |

(Continued)

FOREIGN PATENT DOCUMENTS

EP 1 134 949 A2 9/2001

OTHER PUBLICATIONS eSecurityOnline, OVS Online Vulnerability Service, Solutions Before Problems, 2001, online information.

(Continued)

*Primary Examiner* — Saket K Daftuar
(74) *Attorney, Agent, or Firm* — Baker Botts L.L.P.

(57) ABSTRACT

The disclosed methods and systems can be used to manage at least one asset in an Enterprise, where the methods and systems include providing a first server, the first server configured to include at least one asset profile associated with the at least one asset, the first server controlled by the Enterprise, and receiving at the first server, in response to a request to a distinct second server, data associated with at least one vulnerability associated with the at least one asset, where the second server is outside the control of the Enterprise.

41 Claims, 10 Drawing Sheets

(56) References Cited

U.S. PATENT DOCUMENTS

| | | | |
|---|---|---|---|
| 6,397,381 B1 * | 5/2002 | Delo et al. | 717/174 |
| 6,401,241 B1 * | 6/2002 | Taylor | 717/174 |
| 6,418,554 B1 * | 7/2002 | Delo et al. | 717/174 |
| 6,418,555 B2 * | 7/2002 | Mohammed | 717/169 |
| 6,427,227 B1 * | 7/2002 | Chamberlain | 717/124 |
| 6,523,027 B1 * | 2/2003 | Underwood | 707/4 |
| 6,535,227 B1 * | 3/2003 | Fox et al. | 715/736 |
| 6,560,614 B1 * | 5/2003 | Barboy et al. | 707/201 |
| 6,594,735 B1 * | 7/2003 | Baker et al. | 711/147 |
| 6,601,233 B1 * | 7/2003 | Underwood | 717/102 |
| 6,631,416 B2 * | 10/2003 | Bendinelli et al. | 709/227 |
| 6,681,323 B1 * | 1/2004 | Fontanesi et al. | 713/1 |
| 6,684,397 B1 * | 1/2004 | Byer et al. | 717/168 |
| 6,698,021 B1 * | 2/2004 | Amini et al. | 725/105 |
| 6,704,824 B1 * | 3/2004 | Goodman | 710/300 |
| 6,725,453 B1 * | 4/2004 | Lucas et al. | 717/178 |
| 6,751,794 B1 * | 6/2004 | McCaleb et al. | 717/168 |
| 6,789,255 B1 * | 9/2004 | Pedrizetti et al. | 717/169 |
| 6,801,940 B1 * | 10/2004 | Moran et al. | 709/224 |
| 6,802,061 B1 * | 10/2004 | Parthasarathy et al. | 717/173 |
| 6,820,133 B1 * | 11/2004 | Grove et al. | 709/238 |
| 6,859,923 B2 * | 2/2005 | Taylor | 717/172 |
| 6,883,101 B1 * | 4/2005 | Fox et al. | 726/25 |
| 6,886,035 B2 * | 4/2005 | Wolff | 709/219 |
| 6,895,383 B2 * | 5/2005 | Heinrich | 705/7.28 |
| 6,904,449 B1 * | 6/2005 | Quinones | 709/203 |
| 6,950,847 B2 * | 9/2005 | Harrisville-Wolff et al. | 709/201 |
| 6,952,779 B1 * | 10/2005 | Cohen et al. | 726/22 |
| 6,961,748 B2 * | 11/2005 | Murrell et al. | 709/202 |
| 6,966,058 B2 * | 11/2005 | Earl et al. | 717/171 |
| 6,968,184 B2 * | 11/2005 | Criss et al. | 455/418 |
| 7,096,502 B1 * | 8/2006 | Fox et al. | 726/25 |
| 7,403,946 B1 * | 7/2008 | Taylor | 707/612 |
| 2001/0039565 A1 | 11/2001 | Gupta | 709/203 |
| 2002/0016757 A1 * | 2/2002 | Johnson et al. | 705/36 |
| 2002/0059446 A1 | 5/2002 | Visalli et al. | 709/236 |
| 2003/0028803 A1 * | 2/2003 | Bunker et al. | 713/201 |
| 2003/0041125 A1 * | 2/2003 | Salomon | 709/220 |
| 2003/0041130 A1 * | 2/2003 | Harrisville-Wolff et al. | 709/221 |
| 2003/0110392 A1 * | 6/2003 | Aucsmith et al. | 713/200 |
| 2003/0115150 A1 * | 6/2003 | Hamilton et al. | 705/64 |
| 2004/0015938 A1 * | 1/2004 | Taylor | 717/168 |

OTHER PUBLICATIONS eSecurityOnline, MBS Minimum Baseline Service, Solutions Before Problems, 2001, online information.

European Patent Office, Decision to refuse a European Patent application, Application No. 02 807 533.1-2221, 21 pages, Feb. 27, 2009.

* cited by examiner

Figure 5

Multiple vendor telnet daemon buffer overflow vulnerability

Vuln. ID: 3814

Discovery Date: 7/18/2001

Discovered By: scut

Date Published: 7/19/2001

Description: The telnet daemon for multiple operating system distributions is vulnerable to a flaw that allows remote attackers to gain root access or cause a denial of service. The problem is related to an unchecked buffer in the telrcv function, which processes telnet options. The results of the options parsing are stored in a buffer called 'netobuf' which is BUFSIZ, but can be overflowed to (BUFSIZ / 2) * 9 - BUFSIZE bytes. The problem allows remote attackers to cause an overflow and gain root access or cause a denial of service on some systems.

* Vuln. Risk: 9.1
  - Impact: 10
  - Popularity: 10
  - Simplicity: 7

Exploit Remotely: Yes

Exploit Locally: No

* eSO's Vulnerability Risk Formula = (Impact * .4) + (Popularity * .3) + (Simplicity * .3)

Technical recommendation:

Wait for a patch from the vendor or disable the service.
BSDI:
Upgrade with the latest patches:

METHODS AND SYSTEMS FOR MANAGING ENTERPRISE ASSETS

CLAIM OF PRIORITY

This application claims priority to U.S. Ser. No. 60/389,539 entitled "Framework" filed on Jun. 18, 2002, the contents of which are incorporated by reference herein in their entirety.

RELATED APPLICATIONS

This application is co-pending with a related application entitled "Methods and Systems for Managing Assets," filed on the same day as this application, and naming the same inventors.

FIELD

The disclosed methods and systems relate generally to computer configuration methods and systems.

BACKGROUND

Managing computer information and/or network security can be challenging and a configuration program can be fundamental to the overall success of an Enterprise. The result of a security breach can vary depending on the severity of the breach and the nature of the compromised system. Examples are loss from fraud, theft of information, disruption of service, unauthorized use of resources, loss of customer confidence, and brand erosion. Maintaining an effective computer configuration program, however, can be difficult due to a changing nature of security threats, shortages of information technology (IT) resources, lack of security awareness, implementation difficulties, and other issues.

SUMMARY

The disclosed methods and systems include methods for managing at least one asset, the method including associating the at least one asset with at least one user; and providing the at least one user with at least one task list that includes at least one task associated with a vulnerability of the at least one asset and at least one task associated with at least one configuration standard associated with the at least one asset. The task list(s) can be at least one of an asset administration task list, an overdue notification task list, an archive notification task list, an approval task list, and an asset risk exception task list. The configuration standard(s) can include at least one minimum baseline procedure associated with at least one operational characteristic of the asset(s), and can include a procedure for implementing an operational characteristic of the asset(s) The asset(s) can include one or more asset components, where an asset component can be an application(s), a device(s), an operating system(s), and/or a database(s).

The user can be associated with at least one responsibility group, and can be provided with at least one interface to associate the asset(s) with a user(s). Asset(s) can thus be associated with an Enterprise(s), a functional unit(s), and a responsibility group(s).

The disclosed methods also include providing at least one policy, where a configuration standard can be associated with one or more policies. A policy can further be associated with an Enterprise. A policy can include a name, a purpose, and a statement, and a default policy can be provided.

Also included is a method for generating at least one vulnerability profile that can be associated with at least one detected vulnerability of an asset(s), where the vulnerability profile(s) can include at least one link to one or more software patches and/or other information associated with the vulnerability. A user(s) can be notified of the generated vulnerability profile. The link to the a patch can include one or more uniform resource locators (URLs).

The methods and system also include providing one or more reports based an asset profile(s), a vulnerability profile(s), and at least one configuration standard(s). The report can thus include an asset vulnerability assessment report, an asset configuration standard assessment report, an asset vulnerability risk state report, an asset configuration standard risk state report, a vulnerability status summary report, a configuration standard status summary report, and an ad hoc report.

The disclosed methods and systems can include a scanning module to detect one or more vulnerabilities of one or more assets. The detected vulnerabilities can be associated with assets and/or assets components that may or may not be associated with a user(s). The scanning module can also detect assets and/or asset components that may not be associated with a user(s).

Also disclosed is a system for managing at least one asset, the system including at least one memory to associate one or more asset(s) with one or more vulnerabilities and one or more configuration standards, and a processor with instructions for causing a processor to associate the asset(s) with a user(s), and provide the user(s) with a task list(s) that includes one or more tasks associated with a vulnerability of the asset(s) and a task(s) associated with a configuration standard(s) associated with the asset(s). The assets can include one or more asset components, where an asset component can be one or more applications, devices, operating systems, and/or databases. A vulnerability and/or a vulnerability profile can include a vulnerability name, a discovery date, a description of the vulnerability, a vulnerability type, a vulnerability risk rating, and a list or association with one or more assets affected by the vulnerability. The configuration standard can include a configuration standard name, a description of the configuration standard, a list of one or more assets associated with the configuration standard, at least one responsibility group name, at least one risk statement, at least one implementation procedure, at least one implementation script, and at least one manual review procedure.

The disclosed methods and systems include method for managing at least one asset in an Enterprise. An asset can be a processor-controlled device that can include hardware and software components known as asset components. An Enterprise can be an identifier that can be associated with one or more assets, and can include, for example, a company, educational institution, organization, individual, or other entity. The method can thus include providing a first server, the server configured to include at least one asset profile associated with the at least one asset, the first server controlled by the Enterprise; and, receiving at the first server, in response to a request to a distinct second server, data associated with at least one vulnerability associated with the asset(s).

The first server can be controlled by the Enterprise can be physically located within a device and/or area that is physically accessible and/or otherwise controlled by the Enterprise. The distinct second server may be controlled by the Enterprise, or may be accessible via one or more networks that can include the internet.

The received data can be received using the internet and/or a portable memory such as a Compact Disk (CD), Digital Video Disk (DVD), floppy disk, or another portable memory component that can be accessed by the server and the distinct second server. The data may be received over a secure communications link that can include anonymous Secure Socket Layer (SSL) or another secure method.

A request for data to the second server can be initiated by the Enterprise-controlled server, and such request can be at asynchronous and/or fixed intervals, and can be based on or otherwise include data associated with the asset(s), and/or data associated with one or more asset profiles that may be associated with the asset(s). The request may include a request for updates at periodic intervals, and the Enterprise-controlled server may filter the received data based on, for example, vulnerability profile(s), the asset profile(s), a configuration standard(s), a risk assessment(s), and/or a task list that may be associated with the asset(s). The request can also include a time and/or a date, and the response can be conditioned based on the time and/or date.

When data is received, the asset profiles, configuration standard(s), risk assessment(s), vulnerability profile(s), and/or task list(s) can be queried to determine whether the received data affects the at least one asset. Based on the received data, which can include a link to a patch and/or a software patch, the software patch or other fix can be obtained and applied to one or more assets that may be affected by or otherwise associated with the received data. Applying a patch to an asset(s) can include determining whether the received data is associated with a global asset configuration and/or an individual asset configuration associated with the asset(s).

Upon receiving a request, the second server can associate the request with an account and at least one privilege that can be associated with the account. The second server can also perform a validation and/or an authentication, and based on the validation and/or authentication, respond to the request.

The methods and systems also include an auto-discovery method and/or module that can perform an auto-discovery of assets of the Enterprise. Also included can be an automatic inventory of the Enterprise, which may cause an inventory of the different assets of an Enterprise. Auto-discovery and auto-inventory can be performed in a sequential order in some embodiments. Information and or data received from the auto-discovery and/or auto-inventory can be used to create an asset profile(s) and/or to modify an existing asset profile(s). An asset task list(s) can be automatically generated, based on the auto-discovery and/or auto-inventory data.

In one example, a remediation module or process can be employed to apply a vulnerability fix, software patch, etc., to one or more assets based on one or more of an asset profile(s), configuration standard(s), risk assessment(s), vulnerability profile(s), and task list(s). Based on the remediation process and/or module that may modify an asset(s) and/or an asset component(s), an asset profile can be modified. A task list associated with the modified asset(s) and/or asset component(s) can also be modified.

Also disclosed are systems for managing at least one asset in an Enterprise, the system including a first server controlled by the Enterprise and configured to include at least one asset profile associated with the at least one asset, and, a distinct second server to provide data in response to a request from the first server, the data associated with the at least one vulnerability associated with the asset(s). At least one of the first server and the second server include a vulnerability module. The second server includes account data associated with the first server, the account data including privilege data for responding to requests from the first server. The first server also includes a workflow module, a scanning module, an auto-discovery module, an auto-inventory module, and/or an auto-remediation module.

Other objects and advantages will become apparent hereinafter in view of the specification and drawings.

BRIEF DESCRIPTION OF THE DRAWINGS

FIGS. 2-7 include exemplary interfaces for a system according to FIG. 1;

DETAILED DESCRIPTION

Figure 1A:
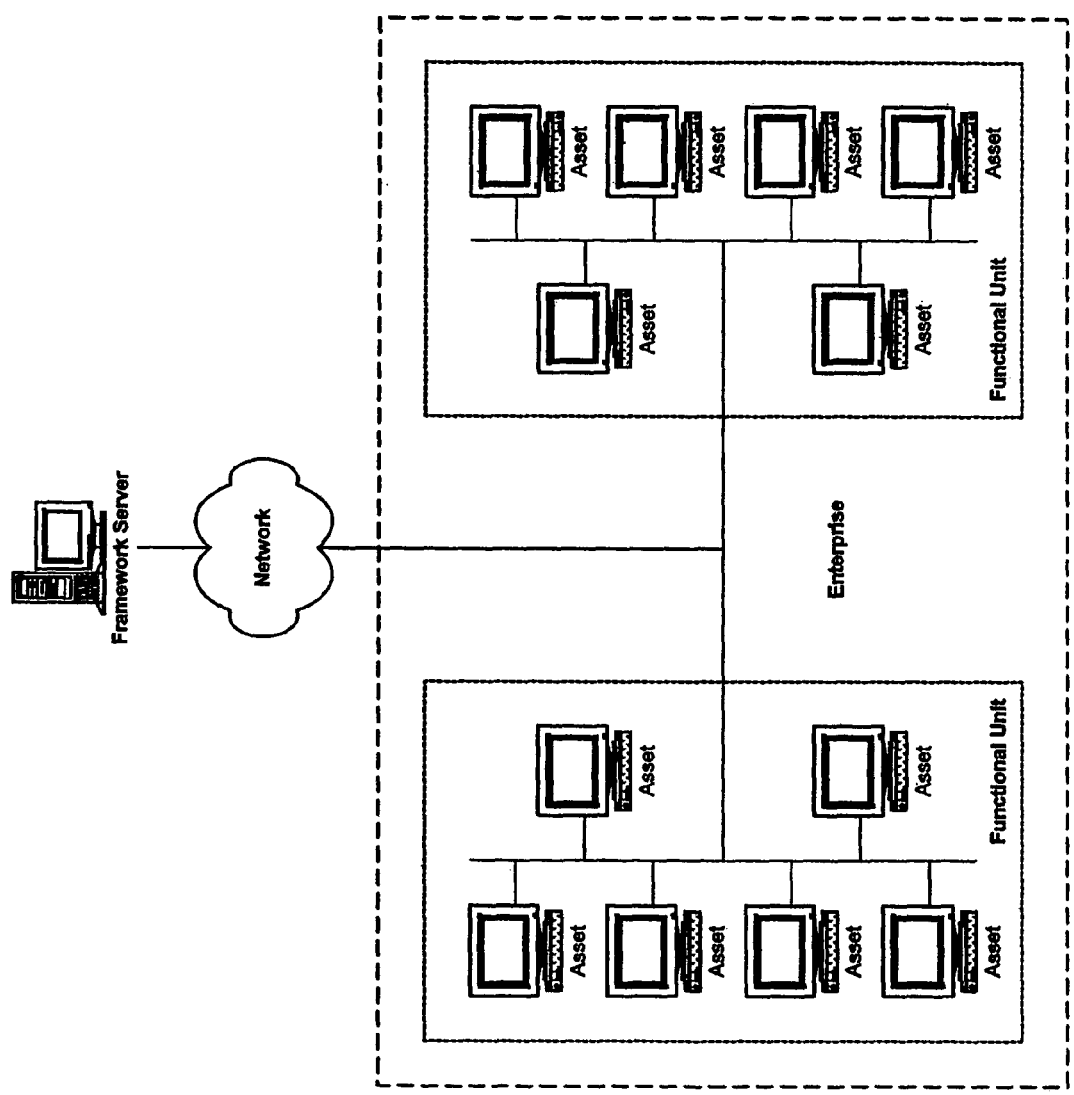
FIG. 1A is a block diagram of a system for use in managing assets of an Enterprise.

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the disclosed systems or methods.

An illustrative embodiment will be discussed in the context of a system having a Framework Server, which can otherwise be understood to be a server, in communication with one or more processor-controlled devices. The term "Framework Server" refers to one or more processor-based or processor-controlled systems or devices as provided herein, with instructions to cause the processor(s) to act in accordance with the disclosed methods and systems. A Framework Server and/or other processor-controlled device(s) can be connected via a network using one or more intranets, for example. The processor-controlled devices can thus communicate with a Framework Server using wired and/or wireless communications links and protocols employing one or more networks. For example, the communications link can include the internet, while in one embodiment, a Framework Server can be part of an intranet that also includes the processor-controlled devices. A Framework Server and/or the processor-controlled devices can include a variety of peripheral devices (e.g., keyboard, stylus, printer(s), internal and external memory components (e.g., CD, DVD, external hard drive, etc.), and mouse). The processor-controlled device(s) can be referred to herein as an "asset", while hardware and/or software to which a processor-controlled device ("asset") has access to, or otherwise can be associated with, can be referred to as an "asset component". Examples of asset components include databases, operating systems, peripheral and/or hardware devices ("devices", e.g., memory, printers, external hard drives, switches, routers, hubs, and modems), and/or applications.

As provided herein, an Enterprise can be an identifier associated with one or more assets. In some embodiments, an Enterprise can be the asset owner or another responsible for maintaining, configuring, and/or controlling the assets. Example Enterprises may include a corporate or business entity, an individual, a governmental body, or another identifiable person and/or entity. Assets can be associated with a person who can be associated with an Enterprise. In one example, an asset can be associated with an employee of a corporate entity.

An Enterprise can include one or more functional units that may distinguish, separate and/or associate people, policies, and assets. Accordingly, an Enterprise asset can be associated with at least one functional unit and the asset can be assigned to at least one responsibility group. A functional unit may be a corporate department (e.g., finance, marketing, operations), geographic region (North America, Asia, Europe), or other designated group within an Enterprise, where such designation may be independent of an asset(s).

The term "responsibility group" refers to one or more persons associated with an Enterprise, where a responsibility group may be further associated with one or more assets, and it can be understood that members of the responsibility group can be responsible for managing the associated one or more assets of an Enterprise.

A policy can be a textual or other statement that may represent an Enterprise's objectives at an Enterprise level, and/or at levels of a functional unit and/or a group of functional units, where the objectives can be based at least in part on assets. For example, one or more policies can be assigned to an Enterprise (e.g., a policy that applies across an Enterprise) or to a functional unit (e.g., a policy that applies to a one or more, but not all functional units in an Enterprise). A policy can guide the development of more specific rules that are referred to herein as "configuration standards".

A configuration standard can be a specification for the implementation of at least part of a policy. In one embodiment, a configuration standard can include a minimum baseline procedure associated with an operational characteristic of an asset component, an asset, a group of assets, a functional unit, or an Enterprise. A configuration standard can be a textual statement, but in some embodiments, a configuration standard can be presented using processor instructions. For example, an "Enterprise-wide minimum password length" configuration standard can specify login passwords for users associated with an Enterprise, where such password can have a minimum of six alphanumeric characters because such passwords can be considered generally less susceptible to attack.

References to "a user" can be understood to include one or more persons associated with a user account record stored in a memory accessible by a Framework Server. A user account record can include, but is not limited to, a user identifier (e.g., a login name and password, a fingerprint, a voice sample), the names of one or more functional units to which the user can be associated, and the user's role in an Enterprise. A role can represent a set of privileges. The terms "a privilege" or "a set of privileges" can refer to a user's right and/or ability to perform an action on one or more assets, where an action can include, where an action can include, for example, executing an application, downloading a web page, querying a database table, accessing data, accessing information associated with one or more assets, generating a report, and viewing a menu item.

The disclosed methods and systems provide a Framework Server for designing, implementing, evaluating, and monitoring an Enterprise security posture. A Framework Server can enable an Enterprise to manage assets of an Enterprise by providing security tools that utilize, or otherwise can access a database of validated security content including policies, configuration standards, and vulnerability data. A Framework Server can also provide a workflow mechanism that delivers data associated with security policy awareness, system configuration standards, vulnerability management that can be provided in a continuous manner, risk assessment, and ad hoc and other reporting.

As shown in FIG. 1A, an exemplary system 100 includes a Framework Server 102 that communicates with assets 104 of an Enterprise 106 over a network 108 such as the Internet or an intranet. The communications between the illustrated Framework Server 102 and the assets 104 may comply with HTTP (HyperText Transfer Protocol), TCP/IP (Transfer Control Protocol/Internet Protocol), or other communication protocols. Although the illustrated system 100 is shown with a single Enterprise having two functional units 110, a Framework Server 102 can be connected to one or more Enterprises 106 that may have one or more functional units 110. As provided previously herein, the illustrated Framework Server 102 and assets 104 can be understood to be processor-controlled devices as provided previously herein. A Framework Server 102 and the assets 104 thus include one or more processors and one or more memories and/or memory components. The assets 104 can also include one or more asset components.

A Framework Server 102 can include, or otherwise can access a memory that includes a database that can be, for example, a SQL (Structured Query Language), Microsoft Access, Informix, and/or Oracle compliant database, although other structured and non-structured databases and/or memory data structures (e.g., linked-lists, queues, graphs, tables, etc.) may be used. The memory thus can include associated user account records, policies, configuration standards, asset profiles, vulnerability profiles, and risk assessment questionnaires, although other and/or less information can be stored and/or associated. A Framework Server 102 can also include instructions for providing interfaces to provide access to the stored information. For example, a Framework Server 102 may include Apache® web-server instructions that respond to a received URL (Uniform Resource Locator) by transmitting an interface.

Figure 1B:
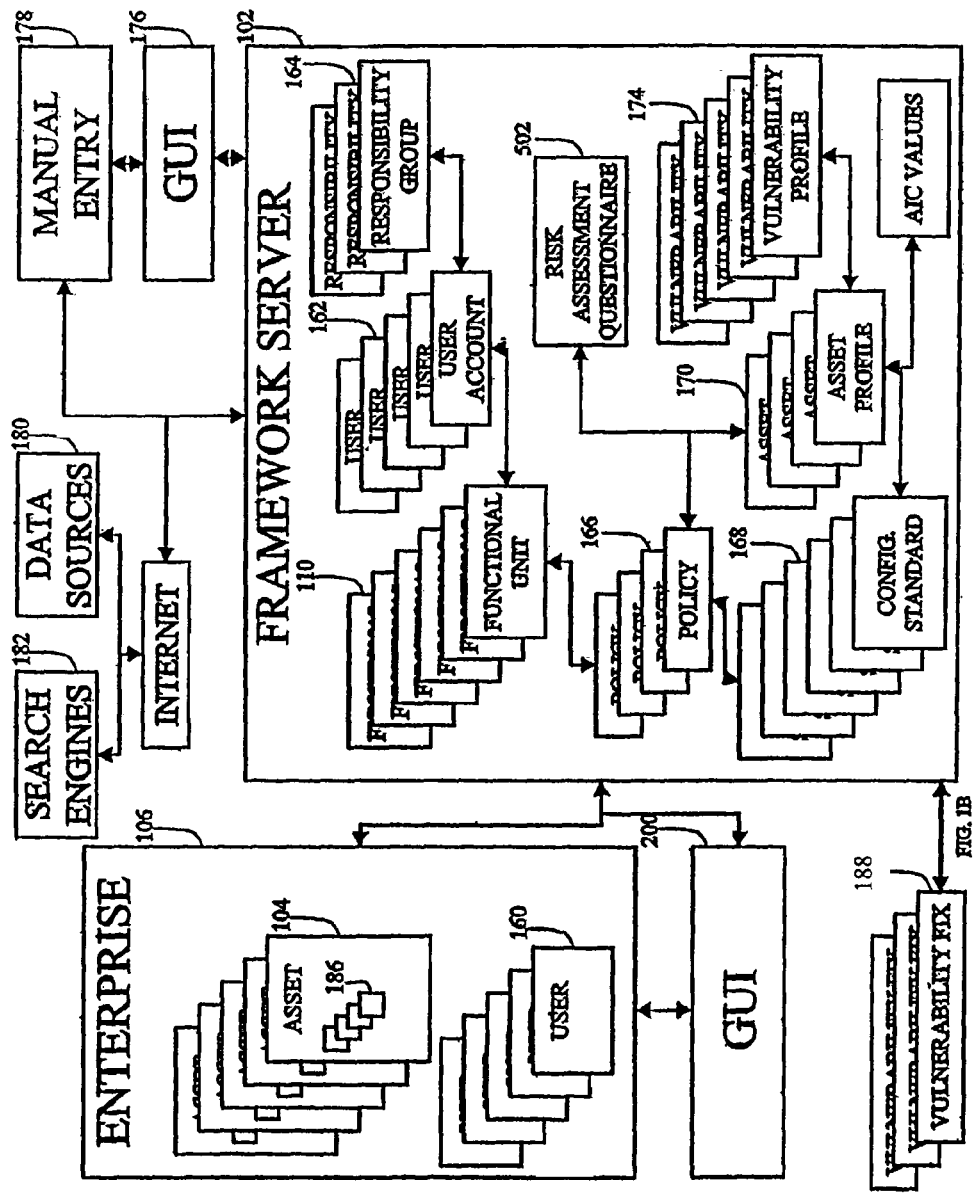
FIG. 1B is a block diagram according to the disclosed methods and systems.

Accordingly, FIG. 1B illustrates one system according to the disclosed methods and systems that illustrates some features that will be described more fully herein. For example, FIG. 1B includes an Enterprise 106 that can include one or more assets 104, where an asset can further include one or more asset components 186. An Enterprise 106 can also be associated with or otherwise include one or more users 160. An Enterprise 106 can communicate with a Framework Server 102 via a GUI 200 and/or the internet, where information regarding the Enterprise's assets 104 can be associated with asset profiles 170, and Enterprise users 160 can be associated with user accounts 162. In the FIG. 1B embodiment, the users accounts 162 can be associated with one or more responsibility groups 164 and functional units 110. As provided herein, functional units 110 can be associated with one or more policies 166 that can further be associated with one or more configuration standards 168. The configuration standards 168 and/or policies 166 can be associated with the asset profiles 170, which can also be associated with one or more vulnerability profiles 174 and/or a risk assessment questionnaire 502. Information related to the vulnerability profiles 174, for example, can be based on data received from data sources 180 and/or search engines 182 and/or other sources as will be provided herein, where such sources can be accessed via the internet or one or more other networks (e.g., intranet), or can be directly provided to the system. For example, FIG. 1B includes an embodiment where data based on vulnerability profiles, for example, can be entered directly by manual entry 178 or through a GUI 176 that may include internet and/or other network communications. As indicated by FIG. 1B, a Framework Server 102 can provide data to an Enterprise 106, and for example, users 160 of the Enterprise 106, where such data can be based on at least one of vulnerability profiles 174, configuration standards 168, risk assessment questionnaires 502, and policies 166. A Framework Server 102 can provide, for example, reports and to-do or task lists, although such examples are provided for illustration and not limitation. As an example, a Framework Server 102 can access or otherwise have information with regard to one or more vulnerability fixes, patches, etc. 188 that can be associated with vulnerabilities that may (or may not be) in a vulnerability profile 174. In one embodiment, a Framework Server 102 can inform an Enterprise 106 of fixes 188 that may be associated with assets 104 that may be further associated with the Enterprise 106. For example, a Framework Server 102 may provide information associated with one or more vulnerability fixes 188, including a link such as a hypertext link, a text file, or a communication of the fix 188 (e.g., software code or "patch") to an Enterprise 106. Those of ordinary skill in the art will recognize that the illustrated components of the FIG. 1B Framework Server 102 are merely illustrative of some components that can be associated with the illustrated Enterprise 106, and that similar configurations can exist for other Enterprises that are not shown. Accordingly, the components and/or modules associated with the illustrated Framework Server 102 can be specific to and otherwise associated with the illustrated Enterprise 106 and/or be associated more than one Enterprise 106. For example, one embodiment may maintain "global" vulnerability profiles 174 for multiple Enterprises, and one embodiment may create specific vulnerability profiles 174 for an Enterprise 106. Some embodiments may employ global and specific vulnerability profiles 174.

Those of ordinary skill in the art will also recognize that the various components of FIGS. 1A and 1B, although provided for illustration and capable of being combined and/or otherwise represented as more detailed components, can interact with other components via wired or wireless networks that can include one or more intranets and/or the internet. For example, the illustrated Framework Server 102 can communicate with an Enterprise 106 using one or more intranets and/or the internet, and similarly, such can be understood for other illustrated communicative associations (e.g., Framework Server 102 and vulnerability fixes 188, Framework Server 102 and GUIs 176, 200, GUI 200 and Enterprise 106, Search Engines 182 and Framework Server 102, etc., with such examples provided for illustration and not limitation).

Figure 2:
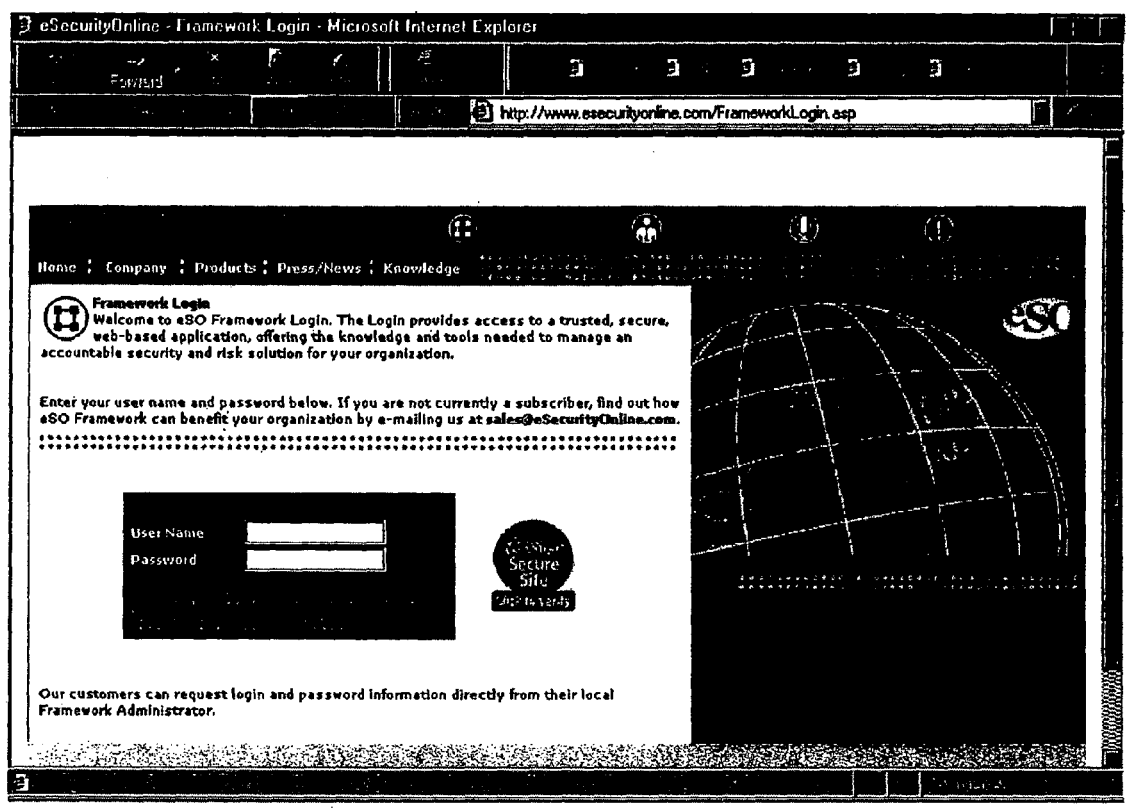

FIG. 2 depicts a web-browser, such as Microsoft Internet Explorer, presenting an exemplary interface 200 through which a user can provide a user identifier. The interface 200 can be encoded in a wide variety of instruction sets/data, such as HTML (HyperText Markup Language) instructions or other SGML (Structured Generalized Markup Language) instructions. The interface 200 can include instructions such as ActiveX components, applets, scripts, etc. A user can enter or otherwise provide a user identifier (e.g., Login Name 202 and Password 204) using a keyboard, stylus, smart card, or other interface device. Those of ordinary skill in the art will recognize that a Framework Server 102 can receive information provided by a user through text boxes, drop-down menus, slider menus, buttons, check boxes, etc. In the exemplary interface 200 shown in FIG. 2, the user can select a "Submit" button 206 to cause the user identifier information to be transmitted to a Framework Server 102 for verification. In one embodiment, a Framework Server 102 can perform a lookup operation or other query of the memory to determine whether the received user identifier is a valid user identifier, and if so, retrieve the user account record associated with the user. Based on a verification and/or authentication of a user, and further based on the user's account (e.g., user profile, privileges, etc.), a Framework Server 102 can provide one or more interfaces through which the user can, for example, create, search, view, and edit policies, configuration standards, asset profiles, vulnerability profiles, and risk assessment questionnaires for an associated Enterprise 106. Those with ordinary skill in the art will recognize that a user's abilities to perform the exemplary actions can be based on the user's account and/or information or data (e.g., permissions, privileges, responsibility group associations, etc.) associated with the account.

Figure 3:
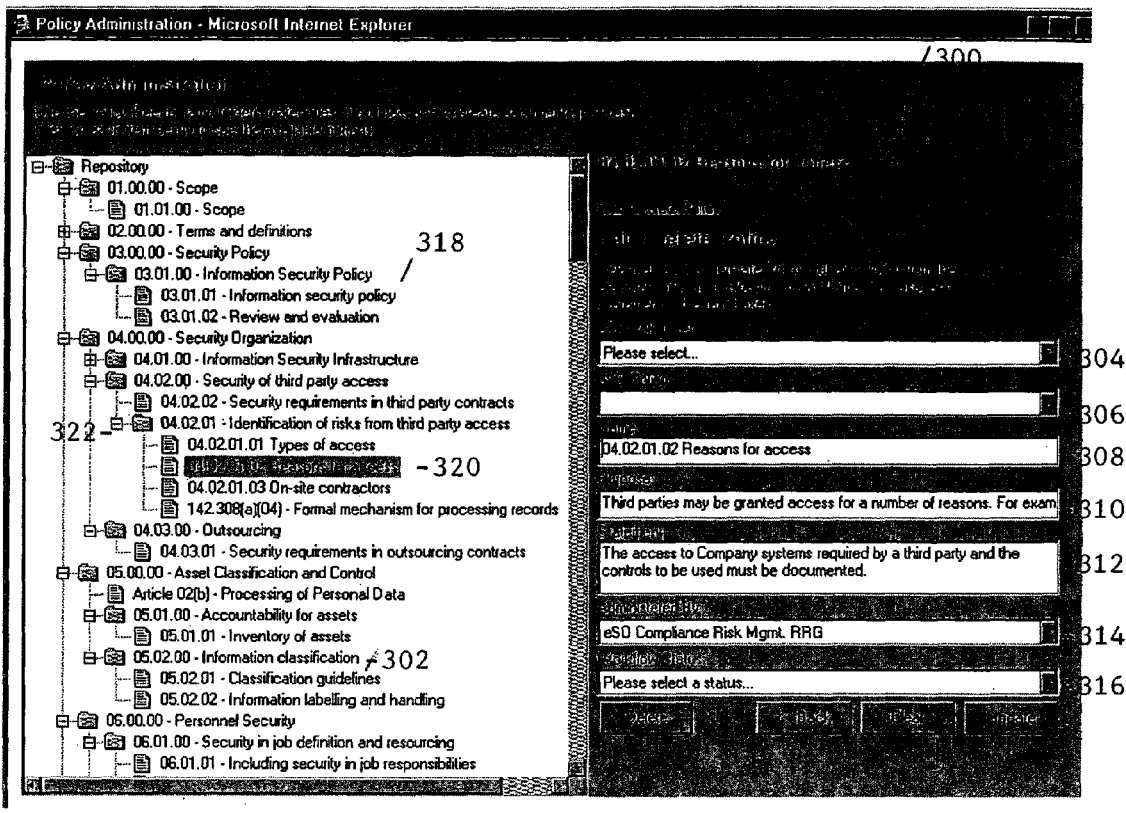

For example, as shown in FIG. 3, a Framework Server 102 can provide an interface 300 through which a user can create, copy or edit an Enterprise's policies. In one embodiment, a Framework Server 102 can manage an Enterprise's policies using a hierarchical file management system ("Policy Tree 318") as shown in the left-hand window 302 of the exemplary interface 300 of FIG. 3. The user can create, copy, edit and/or rename folders (i.e., categories of policies) and/or documents (i.e., policies) in the Policy Tree 318. In one embodiment, a Framework Server 102 can provide the user with an option of creating a policy by selecting and/or customizing a policy from a default policy set, creating a new policy, or a combination thereof. The default policy set can be based on, for example, Ernst & Young's best practices and regulatory guidelines, although those of ordinary skill in the art will recognize that such basis is for illustration and not limitation, and other practices and procedures can be used. To select a policy from the default policy set, the user can select the default policy set from a policy set drop-down menu 304, and then select a policy from a policy drop-down menu 306. If desired, the user can customize a policy by changing the policy information provided in the Name 308, Purpose 310, and Statement 312 text boxes. Alternatively, the user can create a policy by entering a name, purpose, and statement, using for example, the illustrated text boxes 308, 310, 312. For the illustrated system, the user can also select from a drop-down menu 314 a responsibility group that can be notified of the newly-created policy and/or held responsible for maintaining the policy information. Once the information has been entered and/or selected, the user can select an "Update" button 316 to update the Policy Tree 318 and otherwise cause the submitted information to be associated with an Enterprise 106. Such association can be performed by a Framework Server 102. In the example shown in FIG. 3, the user created a policy named "04.02.01.02 Reasons for access" which is a document 320 within the folder 322 entitled "04.02.01 Identification of risks from third party access".

Figure 4:
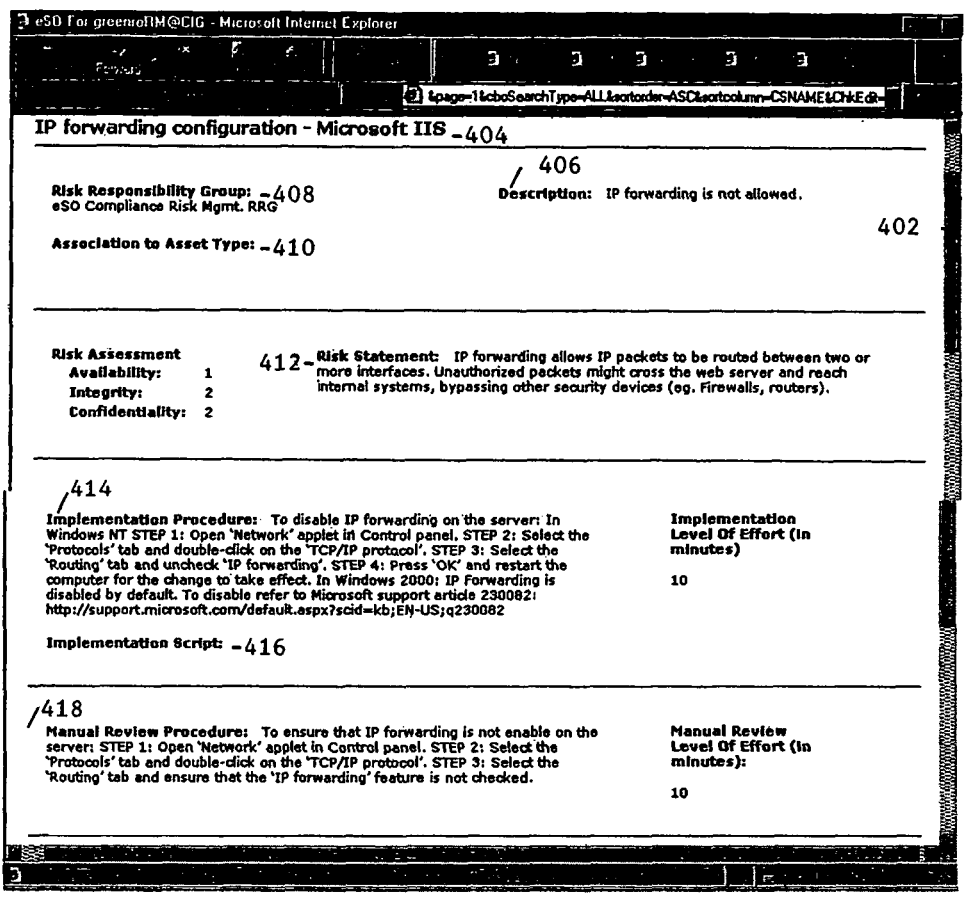

Referring to FIG. 4, a Framework Server 102 can provide an interface 402 through which the user can view, search, create, and edit an Enterprise's configuration standards. As described previously herein, a configuration standard can include a minimum baseline procedure associated with an operational characteristic of an asset component, an asset, a group of assets, a functional unit 110, or an Enterprise 106. In one embodiment, a configuration standard can include a configuration standard name 404, a description of the configuration standard 406, a list of one or more assets and/or asset components associated with the configuration standard 408, a name of a responsibility group assigned to the configuration standard 410, a risk statement 412, an implementation procedure 414, an implementation script 416, and a manual review procedure 418, although other information and/or less information can be included without departing from the scope of the disclosed methods and systems. In one embodiment, a responsibility group 410 can be responsible for reviewing and if appropriate, approving the configuration standard before the configuration standard is released or otherwise is made available to users of an Enterprise 106.

The exemplary configuration standard shown in FIG. 4 is named "IP forwarding configuration—Microsoft IIS" 404 and provides for the disabling of IP forwarding by Microsoft Internet Information Services (IIS) servers on the intranet. The exemplary configuration standard provides an implementation procedure 414 that a member of Responsibility Group 1 (i.e., the associated responsibility group 408) can implement to disable IP forwarding on a Microsoft IIS server on the intranet. In an embodiment, the configuration standard can provide an implementation script 416 that a member of Responsibility Group 1 can execute on a Microsoft IIS server to disable IP forwarding. The implementation script 416 can be a program written in a high-level computer language that includes commands and subroutines for accessing software applications from memory locations within a Microsoft IIS server. The exemplary configuration standard also provides a review procedure 418 (e.g., a manual review procedure) that a Responsibility Group 1 member can access to ensure that the implementation procedure 414 to disable IP forwarding on a particular Microsoft IIS server is properly executed. The exemplary configuration standard can allow a consistent deployment of Microsoft IIS servers that are Enterprise assets.

Figure 5:
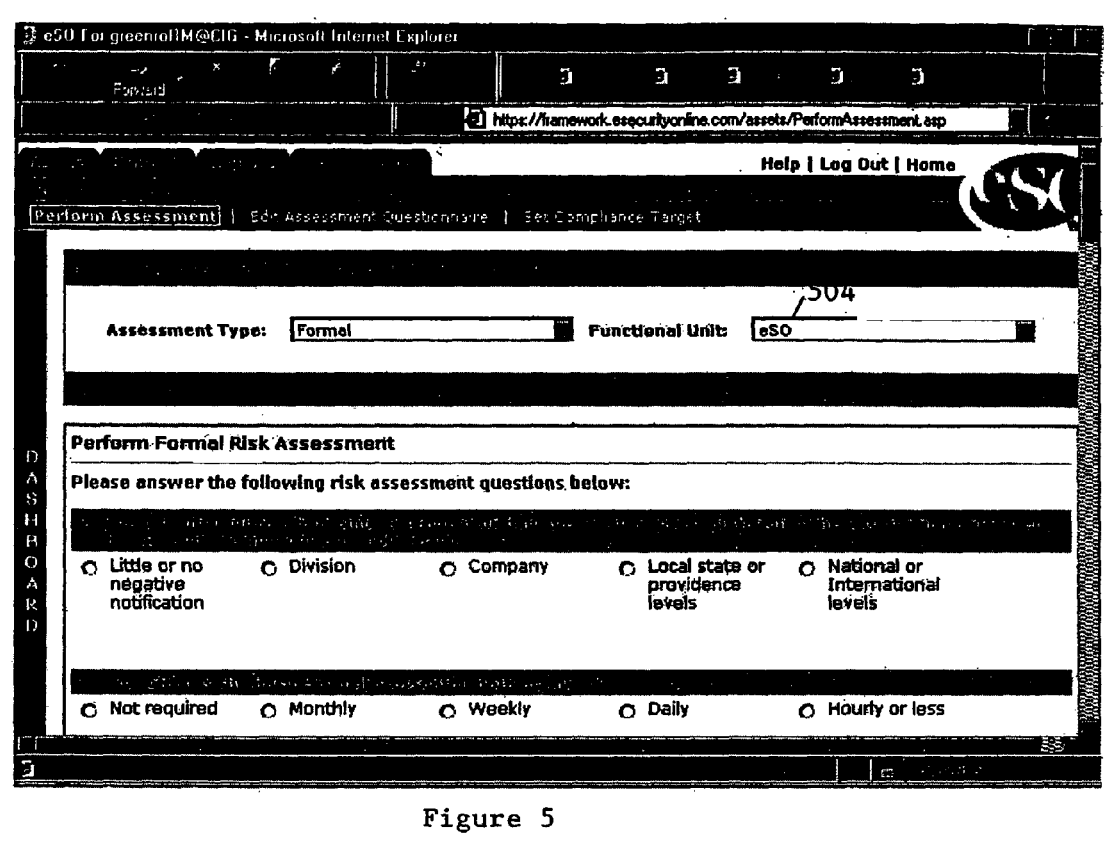

Functional units 110 associated with an Enterprise 106 may have different security requirements based on availability, integrity, and confidentiality (AIC) requirements of assets 104 associated with a functional unit 110. For example, an engineering department that requires its users to have "Top Secret clearance" may likely have different AIC requirements for its assets 104 than an engineering department that requires its users to have "Secret clearance". Accordingly, as FIG. 5 indicates, a Framework Server 102 can provide an interface 500 through which the user can answer a risk assessment questionnaire 502 to define a default risk tolerance level for a functional unit 504. The risk assessment questionnaire can allow a user to respond to one or more questions (e.g., "How often is the business unit's essential data archived?") about risk factors that could affect the assets 104 associated with the functional unit 504, and select a "Submit" button to transmit the risk assessment questionnaire data to a Framework Server 102. A Framework Server 102 can use the questionnaire answers to calculate default AIC values for the assets 104 associated with the functional unit 110. By providing the same questions for different functional units 110, the risk assessment questionnaire can thus generate relative AIC ratings based on the risk assessment answers for the functional units 110. For example, in one embodiment, an AIC value can have a maximum rating of five and minimum rating of zero, depending on the level of security associated with a functional unit 110, although those of ordinary skill in the art will recognize that other rating scales can be used without departing from the scope of the methods and systems.

Figure 6:
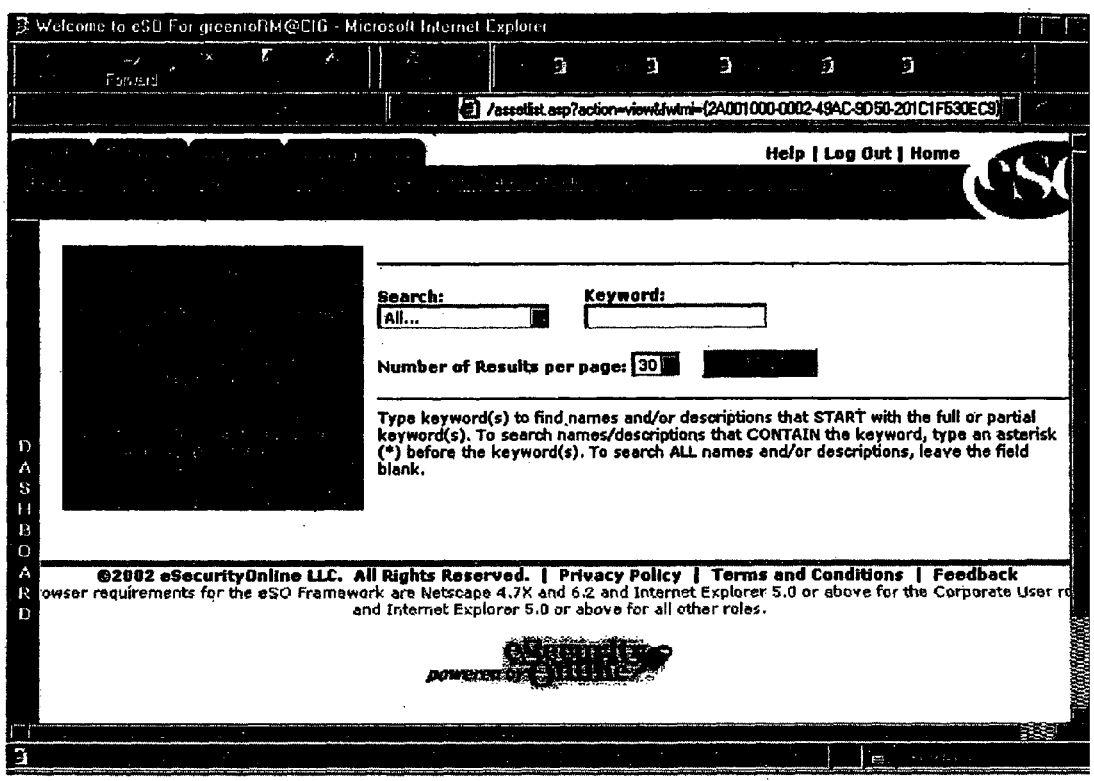

FIG. 6 shows an interface 600 through which a user can view, search, create, and edit an asset profile. An asset profile can include asset components (e.g., databases, operating systems, devices, and applications) of an asset 104. A user can provide or otherwise define an asset profile for an asset 104 (e.g., a production Web server for a web site) or for a group of commonly configured asset components (e.g., a Sun database server running Oracle). An asset profile can thus include an asset name, an asset type, an associated functional unit name, an associated responsibility group name, a manufacturer name, a model name, an asset tag identification, a description of the asset 104, a building name, a geographic location, one or more asset components (e.g., Microsoft Internet Explorer), one or more releases for an asset component (e.g., Microsoft IE 6, Microsoft IE 5.5, Microsoft IE 5.1 for Macintosh), networking information, and protection requirements, although other and/or less asset profile information can be included.

An asset name can include the host name of the asset 104 (e.g., IP address 193.111.101.90), alias (e.g., Microsoft IIS Server—Floor 15), or a description of the type of configuration the asset 104 represents (e.g., a web server on Floor 15 of XYZ Corporation). In an embodiment, asset names can be selected such that the asset names can be unique within a functional unit 110. The networking information can include a qualified domain name, a host name, a subnet mask, and a MAC address. In some embodiments, a user can override default AIC values (provided by a Framework Server 102 for the asset 104 based on the functional unit 110 to which the asset 104 can be associated) by specifying different protection requirements. In an exemplary discussion, it can be understood that default AIC values for a marketing department of XYZ Corporation, for example, are Availability=3, Integrity=1, Confidentiality=2, and that the user is creating an asset profile for an asset associated with the marketing department. The user can override the default AIC values by selecting different AIC values from, for example, a pull-down menu under the protection requirements portion of the web page. If the user selects AIC values (e.g., Availability=1, Integrity=1, Confidentiality=1) that are lower than the default AIC values, a Framework Server 102 can request a risk exception approval by a responsibility group assigned to the asset (i.e., Responsibility Group 1) before the asset profile may be added to a database of asset profiles.

A Framework Server 102 can include a vulnerability module (not illustrated) that can track security vulnerabilities and maintain information regarding vulnerability profiles 174. For example, a vulnerability module can include a database of vulnerability profiles 174. A vulnerability can accordingly be associated with a software patch (i.e., software module) and/or other information associated with the vulnerability 188, where the software patch or other information 188 can be provided to enhance an asset and/or asset component, correct a defect, or otherwise modify an asset and/or asset component. The vulnerabilities can be, for example, security vulnerabilities. The information 188 can be provided using a URL or other means for providing data associated with the vulnerability (e.g., PDF file, Word document, text document, etc.).

The disclosed methods and systems can thus provide a vulnerability module that can automatically update a database of vulnerability profiles when a new vulnerability is detected. In one embodiment, a Framework Server 102 can track or otherwise monitor vulnerabilities from a variety of sources, such as mailing lists, internet web sites, and information disseminated by others (e.g., hackers). When a Framework Server 102 detects a vulnerability (e.g., update of an existing vulnerability, new vulnerability), the vulnerability module can identify the vulnerability, provide a numerical vulnerability risk rating ranging from, for example, one to ten based upon impact (i.e., the results of a vulnerability being exploited), popularity (i.e., how well-known a vulnerability is in the community), and simplicity (i.e., the level of technical expertise required to exploit a vulnerability), classify the vulnerability type (e.g., exploitable remotely and/or locally), archive the vulnerability source code, identify one or more assets and/or asset components that can be affected by the vulnerability, and/or provide a link (e.g., a uniform resource locator) to a patch, although those of ordinary skill in the art will recognize that such information is for illustration and not limitation, and other information and/or less information can be included. In some embodiments, a user or other may not be informed of a vulnerability unless a vulnerability risk rating was within a range, where the range could be specified by the user or another. Those of ordinary skill in the art will recognize that a user or another could establish one or more criteria for determining whether the user receives information regarding a vulnerability, where the criteria can be based on one or more of the vulnerability characteristics provided herein.

A Framework Server 102 can also include instructions to provide interfaces or other means through which users can view and search vulnerability profiles 174 by keyword or other querying techniques, submit new vulnerabilities for investigation and verification, and submit change requests to existing vulnerability profiles 174. In one exemplary interface, menu items can be provided. Accordingly, in one embodiment, upon a user's selection of a menu item associated with a new vulnerability profile 174, a Framework Server 102 can provide a "Submit a New Vulnerability" web page or a "Submit a Vulnerability Change" web page. These web pages or other interfaces can include one or more fields to allow the user to enter or edit, for example a vulnerability name, a discovery date, a description of the vulnerability, a vulnerability type (e.g., exploitable remotely and/or locally), a vulnerability risk rating, and a list of one or more asset components that may be affected by the vulnerability. The user can select a "Submit" button provided on the interface or otherwise cause the information to be transmitted to a Framework Server 102. In one embodiment, a Framework Server 102 can communicate the information to one or more persons and/or entities identified as vulnerability researchers. These one or more vulnerability researchers can review the user submissions, research and test the vulnerability, and, if appropriate, can document the findings in a vulnerability profile 174, which can be added to a database of vulnerability profiles. In an embodiment, a vulnerability profile 174 can be associated with assets and/or asset components for one or more Enterprises.

A Framework Server 102 can include a workflow module that can generate asset-related task lists and risk-related task lists. A task list can be specific to a responsibility group and can serve as a "to-do" list for the members of a responsibility group. A Framework Server 102 can also include instructions for providing interfaces through which a responsibility group member can view, take ownership of, and/or address a task (e.g., to another user) on a task list.

A risk-related task list can include, but is not limited to, an approval task list that identifies new and/or modified policies and/or configuration standards that require review and approval, and an asset risk exception task list that identifies assets 104 for which a user has selected AIC values lower than the default AIC values and hence requires an asset risk exception approval by the responsibility group. For the purposes of this exemplary discussion, it can be understood that User A submitted the "IP forwarding configuration—Microsoft IIS" configuration standard of FIG. 4 for approval, and User B created the "Microsoft IIS Server—Floor 15" asset profile (described previously herein) and selected AIC values that are lower than the default AIC values for the marketing department. As provided previously herein, the "IP forwarding configuration—Microsoft IIS" configuration standard and the "Microsoft IIS Server—Floor 15" asset profile are assigned to Responsibility Group 1 ("RG1"). The workflow module can generate an approval task list for RG1 that includes a task of reviewing and if appropriate, approving the "IP forwarding configuration—Microsoft IIS" configuration standard. A member of RG1 can take ownership of the task and address it by approving and releasing the configuration standard, rejecting the configuration standard, or requiring that one or more portions of the configuration standard be revised (e.g., by User A) and resubmitted for review. Similarly, the workflow module can generate a risk exception task list for RG1 that includes a task of reviewing and if appropriate, allowing the risk exception provided in the "Microsoft IIS Server—Floor 15" asset profile.

An asset-related task list can include, but is not limited to, an asset administration task list, an overdue notification task list, and an archive notification task list. In one embodiment, the asset administration task list identifies new and/or modified vulnerability profiles 174 and/or configuration standards 168 that impact the one or more assets 104 assigned to a responsibility group. The overdue notification task list can identify "overdue" tasks on the asset administration task list; and, the archive notification task list can notify the assigned responsibility group that a vulnerability profile 174 and/or configuration standard 168 may no longer apply because, for example, the asset has been modified (e.g., by removing the asset component affected by the configuration standard).

For the purposes of this discussion, it can be understood that the "IP forwarding configuration—Microsoft IIS" configuration standard of FIG. 4 has been approved and released (i.e., added to a database of configuration standards). The workflow module can generate an asset administration task list for RG1 that includes a task identifying the new "IP forwarding configuration—Microsoft IIS" configuration standard and the assets 104 assigned to RG1 that are affected by the new configuration standard. A member of RG1 can address (i.e., take action) this task by executing the implementation procedure provided in the configuration standard on Microsoft IIS servers assigned to or otherwise associated with RG1, accepting the risk that unauthorized packets may cross the Microsoft IIS servers and reach internal systems by doing nothing, or mitigating the risk by taking some action different from that provided by the implementation procedure. If a task is unaddressed by an RG1 member for a period of, for example, ten days (e.g., an exemplary maximum amount of time a workflow module may permit a task in the asset administration task list to remain unaddressed), the workflow module can generate an overdue notification task list that identifies the task as being overdue. A member of RG1 can address the overdue task by contacting the RG1 member associated with the task, or assigning the task to a RG1 member.

A Framework Server 102 can include a reporting module that enables users to create summary reports and/or detailed reports on asset profiles 170, vulnerability profiles 174, and/or configuration standards 168, although reports detailing other information can be created without departing from the scope of the disclosed methods and system. A Framework Server 102 can include instructions for providing interfaces through which users (e.g., responsibility group members) can view, search, create, and edit pre-defined and/or ad hoc reports that identify and/or otherwise delineate or provide vulnerability profiles and/or configuration standards affecting assets 104 assigned to their respective responsibility group. Examples of pre-defined reports include, but are not limited to, asset vulnerability assessment reports, asset configuration standard assessment reports, asset vulnerability risk state reports, asset configuration standard risk state reports, vulnerability status summary reports, and configuration standard status summary reports. The term "ad hoc report" refers to a report that can be customized by a user to include the fields (e.g., asset name, functional unit 110, asset component 186, responsibility group 164, configuration standard 168) that the user has defined as search query categories. If desired, a user can export the pre-defined and/or ad hoc reports as comma-delimited text files which can be read and opened by a spreadsheet program, including for example, Microsoft Excel®.

A Framework Server 102 can also include a scanning module that performs a scan of an Enterprise's assets 104 including, but not limited to, assets that can be accessed from the Internet (e.g., access gateways, routers, HTTP server, SMTP servers, and telnet servers), and/or provides an interface through which a user can import the results of a scan by a commercially available security scanning program (e.g., Internet Security Systems, Nessus, and CyberCop). In one embodiment, the scanning result can identify the assets by host name (e.g., IP address 193.111.101.90). A Framework Server 102 can search the asset profiles 170 by host name or other querying technique to determine whether the asset is associated with an asset profile. If the search produces a negative result (i.e., the host name of the asset does not match a host name of an asset profile in the database), a Framework Server 102 can provide an interface through which a user can select an asset profile 170 to be associated with the asset 104, or create an asset profile 170 for the asset 104. A scanning module can also probe the assets for vulnerabilities, and provide to the vulnerability module, for example, a report of vulnerabilities that were detected at the assets. In general, a scanning module can serve as a validation tool to assist an Enterprise 106 in identifying assets 104, associating assets 104, and verifying the vulnerability status of assets 104.

The methods and systems can thus be associated with an automated or auto-discovery and/or an auto-inventory (or "inventory") capability. For example, auto-discovery (or "discovery") can be understood to be a capability to probe or otherwise scan a network such as an intranet, for assets 104 and/or asset components 186. In one example, such a capability can be configured to operate as manually requested, or on a scheduled basis such as daily (e.g., at a given time), weekly, monthly, or at another scheduled time period. In one embodiment, the auto-discovery module can accept as input a list or other designation of Internet Protocol (IP) addresses to scan.

An auto-inventory capability can be configured to operate independent of, or in accordance with an auto-discovery capability. An auto-inventory capability can include a process to identify asset components 186, and, as provided herein (e.g., software modules, software patches), such auto-inventory capability can otherwise be a basis for determining or otherwise associating the assets 104 with asset profiles 170, vulnerability profiles 174, configuration standards 168, and/or other components of the disclosed methods and systems. Such inventory and/or discovery systems may thus also allow for an automatic generation of a asset profile 170 and/or associations with one or more vulnerability profiles 174 and/or configuration standards 168. In one example, an auto-inventory and/or discovery capability or module can generate a task list for discovered and/or inventoried assets 104, asset components 186, etc. Accordingly, an inventory and/or discovery capability or module can identify open and/or closed vulnerabilities and/or configuration standard issues and/or tasks.

In an embodiment, the methods and systems can include an automatic remediation ("auto-remediation" or "remediation") capability or module that can allow a software patch to be loaded and/or a task to be performed, as provided by an associated configuration standard 168, asset profile 170, etc., where an associated task list can be updated to indicate the progress and/or results of a remediation process. In one example, an email or other notification may be transmitted to a system administrator, responsibility group (member) 164, or another, with regard to the results and/or an updated task list. Accordingly, in one example, discovery and inventory can be performed, whereupon an asset profile 170 and/or task list can be created, associations with vulnerability profiles 174 and/or configuration standards 168 can be determined, and a remediation module and/or process can cause items from a task list to be resolved by loading a patch and/or fix, whereupon the task list can be updated and provided to a user.

The disclosed methods and systems can thus be employed for system backups. Data and/or information associated with the assets 104 and/or asset components 186 can thus be utilized in a backup mechanism to allow restoration in a case of an asset 104 and/or Enterprise-wide failure. Accordingly, a backup of a Framework Server 102 can be desirable.

The methods and systems also provide for patches/fixes 188 to be applied on an individual asset basis, and/or upon a global asset basis. Accordingly, management of asset profiles 170, configuration standards 168, etc., can be performed globally and/or upon an individual asset. An asset can thus be associated with a global configuration and/or an individual configuration. In some embodiments, an individual configuration may override a global configuration, while in other systems, global configurations may override individual configurations.

Figure 8:
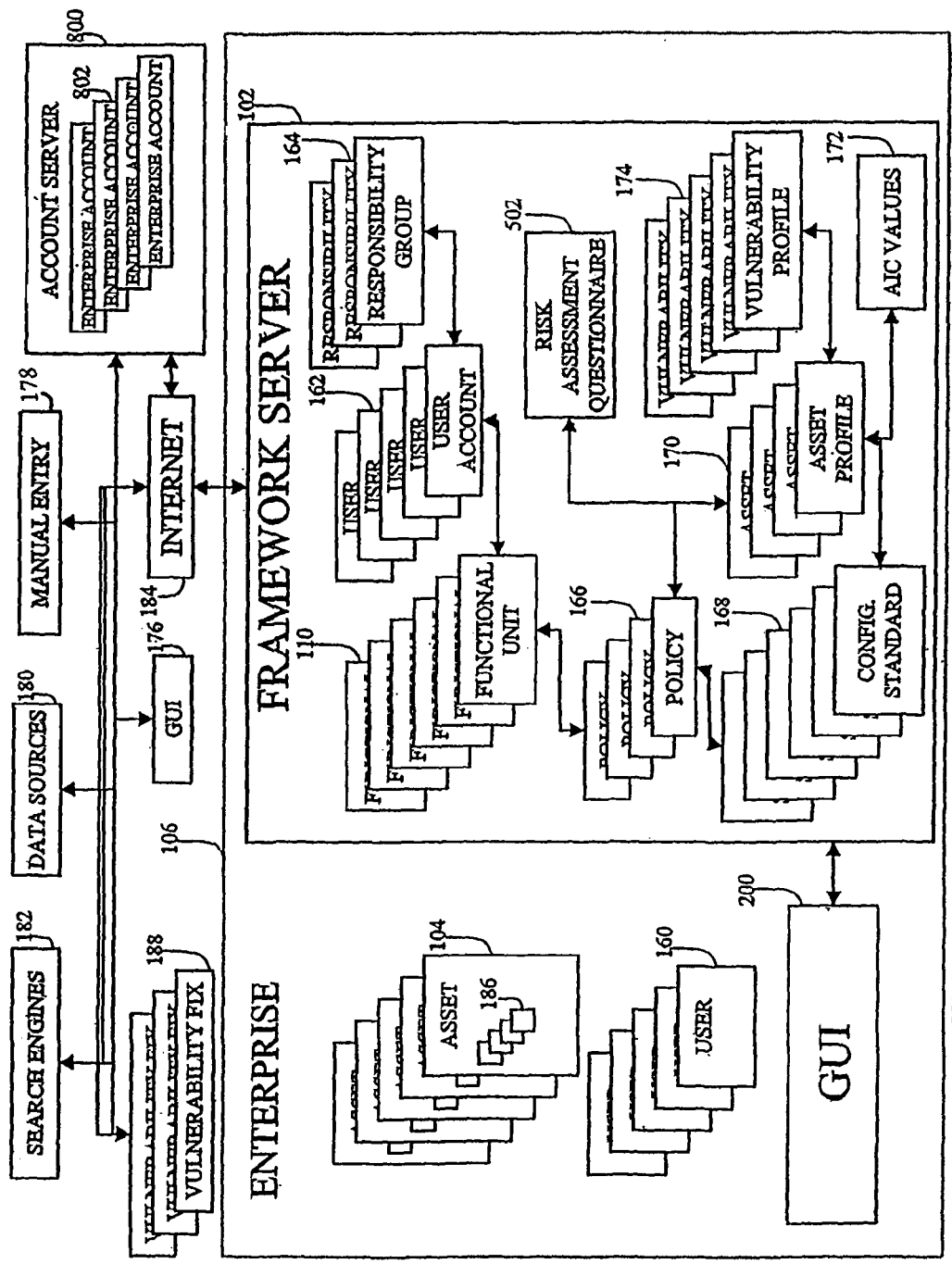
FIG. 8 is a block diagram of one embodiment of the disclosed methods and systems; and, FIG. 9 is a block diagram for hierarchical management based on the disclosed methods and systems.

FIG. 8 illustrates an embodiment of the disclosed methods and systems where a Framework Server 102 can be incorporated into an intranet or other network within which an Enterprise 106 exists. Accordingly, although FIGS. 1A and 1B indicate embodiments, among others, where data associated with an Enterprise 106 such as assets 104, asset components 186, asset profiles 170, functional units 110, user accounts 162, configuration standards 168, and other components may reside on a server (e.g., Framework Server 102) that may be accessed via, for example, the internet, an embodiment according to FIG. 8 illustrates that a Framework Server 102 can additionally and/or optionally be located within a network and/or intranet that can be accessed by an Enterprise 106 without traversing or otherwise accessing the internet. In such an embodiment, accordingly, Enterprise-related information or data such as assets 104, asset components 186, asset profiles 170, functional units 110, user accounts 162, configuration standards 168, and other components, may reside within the network/intranet, and within the security control of the Enterprise 106. In some embodiments, copies of Framework Server 102 data, for example, may be transmitted by a secure channel using a secure communications technique, to an Account Server 800 that may store a backup of a Framework Server 102, although such ability is optional.

According, a Framework Server 102 according to FIG. 8 can be understood to be controlled by the Enterprise 106 in that a system administrator associated with the Enterprise 106 can configure the Framework Server 102 and can provide for system backups of the Framework Server 102, for example. To be within the control of the Enterprise 106 can thus indicate that a Framework Server 102 physically resides at a location that is under the control of, directly or indirectly, the Enterprise 106. Although such an embodiment is also envisioned by the methods and systems of FIGS. 1A and 1B, FIGS. 1A and 1B also envision systems and methods where a Framework Server 102 does not reside within the control of the Enterprise 106, and accordingly in such embodiments, individuals associated with an Enterprise 106 may not have physical control over a Framework Server 102 and may be limited to communicative access via the internet.

In an embodiment according to FIG. 8, the Account Server 800 may optionally and additionally provide an interface to an Enterprise/Framework Server 102 via the internet 184 such that the illustrated Framework Server 102 can communicate to the Account Server 800 to obtain updates on configuration standards, vulnerabilities, and other data. In one example, a Framework Server 102 according to FIG. 8 may establish a secure channel (e.g., anonymous SSL) with an Account Server 800 where a Framework Server 102 can "log-in" or otherwise establish communications with the Account Server 800 such that the Account Server 800 can verify an Enterprise 106 with which a Framework Server 102 can be associated. Based on such association of Enterprise 106 and Framework Server 102, an Account Server 800 may determine associated privileges for a Framework Server 102, where such privileges can be based on an Enterprise Account 802. The FIG. 8 Account Server 800 may thus service requests from the illustrated Framework Server 102 based on such associated privileges. In one example, an Account Server 800 may receive a request, identify an Enterprise Account 802, and determine that the associated privileges indicate that the requesting Framework Server 102 may not be entitled to a response.

As FIG. 8 indicates, an Account Server 800 can receive data and/or other information with regard to configurations, vulnerabilities, etc., through the internet 184 or directly from a variety of sources 182, 180, 178. Accordingly, an Account Server 800 may have systematic and/or scheduled searches for configuration, vulnerability, and other information, and may also receive asynchronous updates (e.g., manual entry) with regard to vulnerabilities and other system data. For example, an Account Server 108 may include a vulnerability module as previously provided herein, while an associated Framework Server 102 may optionally and additionally include a vulnerability module. In one embodiment according to FIG. 8, a Framework Server 102 associated with an Account Server 800 may not include a vulnerability module, and may allow the associated Account Server 800 to perform such features. An Account Server 800 can store such vulnerability information locally (e.g. within an intranet), and/or may store links or other pointers to such information or data, where the data may be accessed via the internet or another network(s). The illustrated Account Server 800 can thus include one or more databases or other memory components for storing vulnerability information and/or Enterprise Account data 802.

Accordingly, in one embodiment, an Account Server 800 can maintain vulnerability profiles 174 and upon a request from a Framework Server 102, provide such vulnerability profile data to the Framework Server 102. The Framework Server 102 may thereafter incorporate the vulnerability profile 174 by associating the vulnerability profile with one or more assets 104 and/or asset profiles 170. In some embodiments, vulnerability data from the Account Server 800 may be in another form, such that a Framework Server 102 may develop a vulnerability profile 174 based on the received data. Accordingly, upon a valid and/or authenticated request from a Framework Server 102, an Account Server 800 may query vulnerability data (e.g., profiles 174) to which the Account Server 800 has access, to determine which vulnerability data may be applicable to the requesting Framework Server 102. In an embodiment, an Account Server 800 query can be based parameters in the request, which may include an asset(s), asset profile(s), risk management, time and/or date, or another parameter upon which a query can be based.

As provided previously herein with respect to the systems and methods of FIGS. 1-7, the illustrated Account Server 800 can receive vulnerability and other information from manual entry 178, search engines 182, and other data sources 180, and can thus access or otherwise include links or pointers to vulnerability fixes or patches 188. Based on a request from a Framework Server 102, for example, an Account Server 800 may return a link to a vulnerability fix 188 to the requesting Framework Server 102. In one embodiment, the request from a Framework Server 102 may include data specific to an asset or configuration. An Account Server 800 may additionally and optionally track requests from a given Framework Server 102 and/or a given asset, for example, to provide data/information based on the request, where such data/information may also be based on a previous request such that a response to the request may include updated information without repeated information. In some embodiments, a Framework Server 102 may additionally and optionally have a feature to filter responses from an Account Server 800 to remove duplicate information. In some embodiments, a request may include time and/or date data to allow an Account Server 800 to respond with data since the specified time and/or data. Those of ordinary skill in the art will recognize that other variations of requests using other data/information may be used.

In an embodiment, a Framework Server 102 according to FIG. 8 can request updates from an Account Server 800 at specified intervals. Such requests can be configured by a system administrator or another associated with an Enterprise 106. One of ordinary skill in the art will recognize that an Account Server 800 can also be configured to provide updates at scheduled intervals to a given Framework Server 102, based on a request by the given Framework Server 102. Such updates can be incremental, as provided herein, and/or filtering techniques can be used as also provided herein.

In one embodiment according to FIG. 8, information and/or data from an Account Server 800 can be provided to a Framework Server 102 via a media such as tape, disk, CD, DVD, or other portable memory component.

Figure 9:
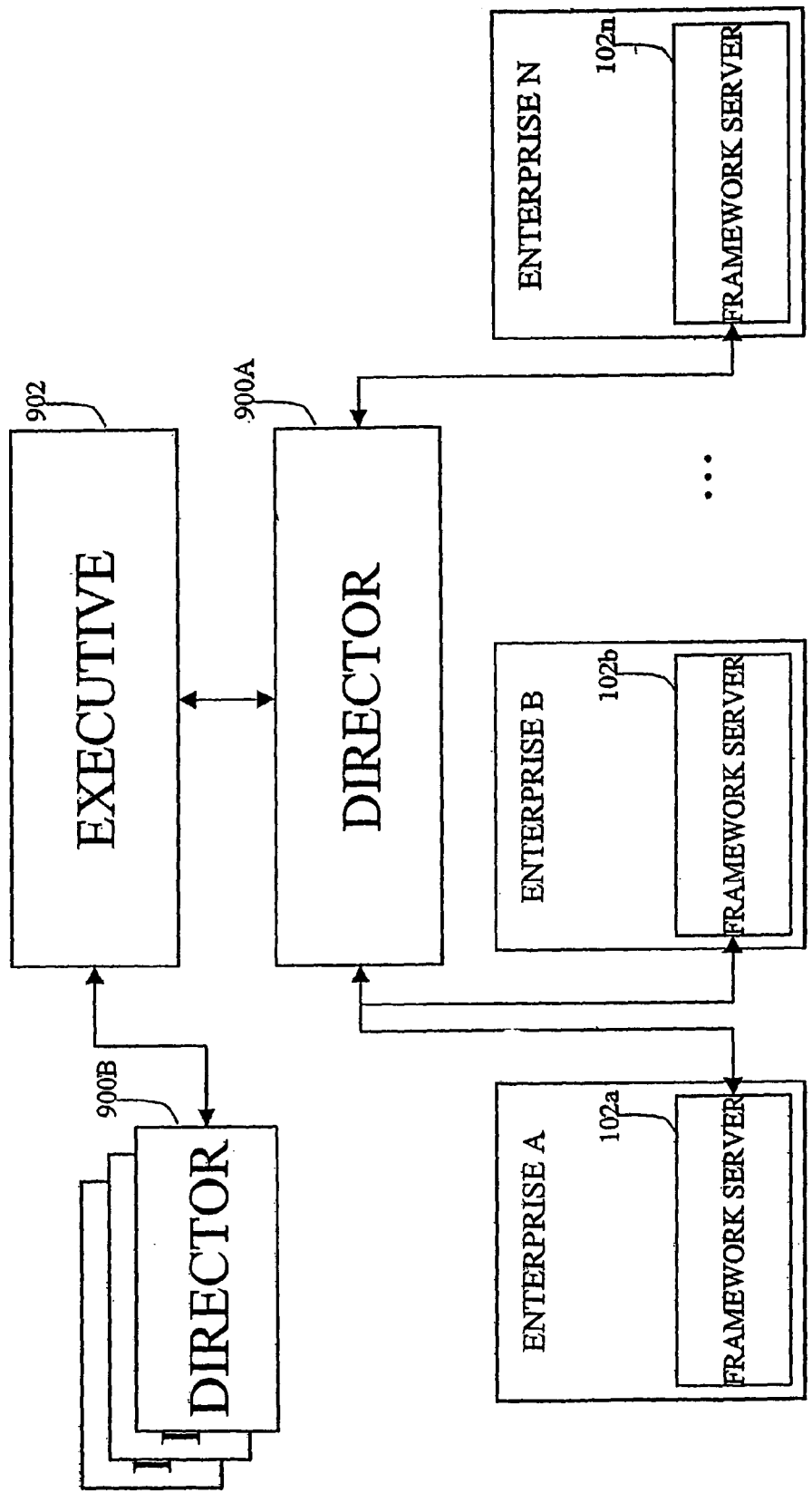

FIG. 9 provides one example where one or more Framework Servers 102a-102n can be managed by a Director 900a that can include the features of a Framework Server 102a-102n, and accordingly, can manage the features of a Framework Server 102a-102n. Not shown in FIG. 9 are one or more Account Servers 800 that may also communicate with Framework Servers 102a-102n and/or the Director 900a. Accordingly, a Director 900a may be able to generate reports based on data provided by Framework Servers 102a-102n, where such reports are described previously herein with respect to a single Framework Server 102. FIG. 9 also indicates that one or more Directors 900a-900b may be in communication with one or more Executives 902 that may be equipped with the capabilities of a Director as provided herein. Those of ordinary skill in the art will thus recognize that the illustrated Directors 900b can be understood to be associated with one or more Framework Servers 102 that are not shown. The Executives 902 may also be in communication with one or more Account Servers 800.

What has thus been described are methods and systems for use in managing at least one asset in an Enterprise, where the methods and systems include providing a first server, the first server configured to include at least one asset profile associated with the at least one asset, the first server controlled by the Enterprise, and receiving at the first server, in response to a request to a distinct second server, data associated with at least one vulnerability associated with the at least one asset, where the second server is outside the control of the Enterprise.

The methods and systems described herein are not limited to a particular hardware or software configuration, and may find applicability in many computing or processing environments. The methods and systems can be implemented in hardware or software, or a combination of hardware and software. The methods and systems can be implemented in one or more computer programs, where a computer program can be understood to include one or more processor executable instructions. The computer program(s) can execute on one or more programmable processors, and can be stored on one or more storage medium readable by the processor (including volatile and non-volatile memory and/or storage elements), one or more input devices, and/or one or more output devices. The processor thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

The processor(s) can thus be embedded in one or more devices that can be operated independently or together in a networked environment, where the network can include, for example, a Local Area Network (LAN), wide area network (WAN), and/or can include an intranet and/or the internet and/or another network. The network(s) can be wired or wireless or a combination thereof and can use one or more communications protocols to facilitate communications between the different processors. The processors can be configured for distributed processing and can utilize, in some embodiments, a user-server model as needed. Accordingly, the methods and systems can utilize multiple processors and/or processor devices, and the processor instructions can be divided amongst such single or multiple processor/devices.

A processor can thus be understood to be a processor-controlled device that can include, for example, a PC, workstation, handheld, palm, laptop, cellular telephone, or other processor-controlled device that includes instructions for causing the processor to act in accordance with the disclosed methods and systems. The devices provided herein are not exhaustive and are provided for illustration and not limitation. References to "a processor", "the processor", and/or "server" (with or without a descriptive modifier) can be understood to include one or more processors that can communicate in a stand-alone and/or a distributed environment(s), and thus can be configured to communicate via wired and/or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network using a variety of communications protocols, and unless otherwise specified, can be arranged to include a combination of external and internal memory devices, where such memory can be contiguous and/or partitioned based on the application. References to a database can be understood to be a reference to memory as provided herein, where such memory may be arranged to associate data, although those of ordinary skill in the art will recognize that other data structures such as linked lists, queues, graphs, arrays, and other data structures, may be similarly employed.

The term "network" refers to both the Internet and/or one or more intranets, unless a distinction is noted.

Although the methods and systems have been described relative to a specific embodiment thereof, they are not so limited. Obviously many modifications and variations may become apparent in light of the above teachings. For example, references to databases can include data associated in a manner to facilitate the disclosed methods and systems, and can include other data structures that can be stored in contiguous and/or non-contiguous memory that can be accessed internally and/or externally using wired and/or wireless communications.

Many additional changes in the details, materials, and arrangement of parts, herein described and illustrated, can be made by those skilled in the art. Accordingly, it will be understood that the following claims are not to be limited to the embodiments disclosed herein, can include practices otherwise than specifically described, and are to be interpreted as broadly as allowed under the law.

What is claimed is:

1. A method for managing assets in a corporate entity, the method comprising:
    providing a first server controlled by corporate entity, the first server configured to:
        store a plurality of asset profiles associated with a plurality of processor-controlled devices associated with the corporate entity,
        determine at least one security requirement based at least in part on risk assessment information associated with the plurality of processor-controlled devices associated with the corporate entity, and
        monitor the plurality of processor-controlled devices to detect at least one security vulnerability;
    communicating a request for data, via an Internet connection, to a distinct second server that physically resides at a location that is outside the control of the corporate entity;
    receiving at the first server, in response to the request to the distinct second server, data associated with the at least one security vulnerability, the data received from the distinct second server that is physically outside the control of the corporate entity via the Internet connection; and
    wherein receiving comprises filtering received data based on at least one of: at least one vulnerability profile, at least one asset profile, at lease on configuration standard, at least one risk assessment, and at least one task list.

2. A method according to claim 1, where receiving comprises receiving at least one of a software patch and a link to a software patch, wherein the software patch is associated with a vulnerability fix.

3. A method according to claim 1, where receiving comprises receiving via at least one of the internet and a portable memory.

4. A method according to claim 1, wherein the request based on at least one of: at least one asset and at least one asset profile.

5. A method according to claim 1, where receiving comprises receiving data at periodic intervals.

6. A method according to claim 1, further comprising requesting data from the at least one distinct second server, the request comprising at least one of a time and a date.

7. A method according to claim 1, further comprising responding to the request based on at least one of a time and a date comprised in the request.

8. A method according to claim 1, where providing comprises providing at least one vulnerability profile associated with at least one of the plurality of assets and the plurality of asset profiles.

9. A method according to claim 8, where receiving comprises querying at least one of the plurality of asset profiles, at least one configuration standard, at least one risk assessment, the at least one vulnerability profile, and at least one task list, to determine whether the received data affects at least one asset.

10. A method according to claim 9, where receiving comprises,
receiving a patch based on the received data, and
applying the patch to at least one asset affected by the received data.

11. A method according to claim 1, where receiving comprises receiving at least one vulnerability profile.

12. A method according to claim 1, further comprising querying vulnerability data at the second server based on at least one of: at least one asset, at least one asset profile, a time, and a date.

13. A method according to claim 1, further comprising obtaining a patch based on the received data.

14. A method according to claim 1, further comprising applying a patch to at least one asset, the patch based on the received data and at least one of a global asset configuration and an individual asset configuration associated with that at least one asset.

15. A method according to claim 1, where receiving comprises receiving over a secure communications link.

16. A method according to claim 15, where the secure communications link comprises anonymous secure socket layer (SSL).

17. A method according to claim 1, further comprising requesting data from the distinct second server at fixed intervals.

18. A method according to claim 1, further comprising,
receiving the request at the distinct second server, and
associating the request with at least one of an account and privileges.

19. A method according to claim 1, where the request comprises data identifying the at least one asset.

20. A method according to claim 1, further comprising performing an auto-discovery of corporate entity.

21. A method according to claim 1, further comprising performing an inventory of corporate entity.

22. A method according to claim 1, further comprising:
performing an auto-discovery of corporate entity,
performing an inventory of corporate entity,
and conditionally performing, based on the least one of the auto-discovery and the inventory:
creating at least one asset profile, and
modifying the at least one asset profile.

23. A method according to claim 22, where modifying the at least one asset profile comprises modifying the at least one profile based on a remediation module.

24. A method according to claim 1, further comprising, employing an automatic remediation process based on the received data and at least one of: at least one asset profile, at least one configuration standard, at least one risk assessment, at least one vulnerability profile, and at least one task list.

25. A method according to claim 1, further comprising,
automatically generating at least one asset task list based on at least one of an automatic inventory and an automatic discovery module, and
updating the at least one asset task list based on an automatic remediation module.

26. A method according to claim 25, where updating comprises,
identifying at least one of: at least one configuration standard and at least one vulnerability profile associated with the asset task list, and
based on the at least one asset task list and the identified at least one of at least one configuration standard and the at least one vulnerability profile, modifying at least one of: at least one asset and at least one asset component.

27. A method according to claim 1, further comprising, associating account information with a request for data to the second server, performing at least one of a validation and an authentication at the second server, and based on the at least one of the validation and authentication, responding to the request.

28. A system for managing at least one asset in a corporate entity, the system comprising:
a first server controlled by the corporate entity and configured to:
store a plurality of asset profiles associated with a plurality of processor-controlled devices associated with the corporate entity,
determine at least one security requirement based at least in part on risk assessment information associated with the plurality of processor-controlled devices associated with the corporate entity, and
monitor the plurality of processor-controlled devices to detect at least one security vulnerability; and
communicate a request for data via an Internet connection;
a distinct second server outside the control of the corporate entity, the distinct second server physically residing at a location that is outside the control of the corporate entity, the second server configured to receive the request for data via the Internet connection, the second server configured to provide data to the first server, via the Internet connection, in response to a request from the first server, the data associated with the at least one security vulnerability;
wherein:
the at least one asset is associated with a user that is an employee of the corporate entity;
the distinct second server is configured to:
maintain a user account record associated with the user; and
perform a lookup operation to determine that the user is associated with the user account record; and
wherein the distinct second server is further configured to:
based on one or more privileges associated with the user, provide one or more interfaces through which the user can perform a task selected from the group consisting of edit policies, create policies, create or edit configuration standards, create or edit asset profiles, create or edit vulnerability profiles, and create or edit risk assessment questionnaires.

29. A system according to claim 28, where the second server stores account data associated with the first server, the account data comprising privilege data.

30. A system according to claim 28, where the first server comprises at least one of a workflow module, a scanning module, an auto-discovery module, an auto-inventory module, and an auto-remediation module.

31. A system according to claim 28, where the first server stores at least one vulnerability profile associated with at least one asset profile.

32. A method according to claim 1, further comprising, if the at least one security vulnerability is a new vulnerability, updating a database comprising one or more vulnerability profiles.

33. A method according to claim 1, further comprising:
providing a numerical vulnerability risk rating associated with the at least one security vulnerability; and
archiving a source code associated with the at least one security vulnerability.

34. A method according to claim 1, further comprising providing a vulnerability risk rating associated with the at least one security vulnerability, the vulnerability risk rating based at least in part on a level of expertise required to exploit the at least one security vulnerability.

35. A method according to claim 1, further comprising informing a user of the at least one security vulnerability if the vulnerability risk rating is within a configurable range.

36. A method according to claim 1, wherein the at least one security vulnerability is detected based at least in part on information from a mailing list or web site.

37. A method according to claim 1, wherein:
the at least one asset is associated with a user that is an employee of the corporate entity;
the distinct second server is configured to:
maintain a user account record associated with the user; and
perform a lookup operation to determine that the user is associated with the user account record.

38. A method according to claim 37, wherein the distinct second server is further configured to:
based on one or more privileges associated with the user, provide one or more interfaces through which the user can perform a task selected from the group consisting of edit policies, create policies, create or edit configuration standards, create or edit asset profiles, create or edit vulnerability profiles, and create or edit risk assessment questionnaires.

39. A method according to claim 1, wherein the first server comprises a scanning module configured to perform a scan of the plurality of assets under the control of the corporate entity, wherein the plurality of assets are configured to be accessed by the first server via the Internet.

40. A system according to claim 28, where at least one of the first server and the second server comprise a vulnerability module.

41. A system according to claim 28, wherein the first server comprises a scanning module configured to perform a scan of the plurality of assets under the control of the corporate entity, wherein the plurality of assets are configured to be accessed by the first server via the Internet.

* * * * *